(12) United States Patent
Matzenmüller

(10) Patent No.: US 7,478,662 B2
(45) Date of Patent: Jan. 20, 2009

(54) APPARATUS FOR SEALING FOILS TO EACH OTHER

(75) Inventor: Jürgen Matzenmüller, Bellamont (DE)

(73) Assignee: Uhlmann Pac-Systeme GmbH & Co. KG, Laupheim (DE)

( * ) Notice: Subject to any disclaimer, the term of this patent is extended or adjusted under 35 U.S.C. 154(b) by 618 days.

(21) Appl. No.: 11/244,813

(22) Filed: Oct. 6, 2005

(65) Prior Publication Data
US 2006/0076112 A1    Apr. 13, 2006

(30) Foreign Application Priority Data
Oct. 9, 2004    (DE) .................... 10 2004 049 266

(51) Int. Cl.
*B23K 37/00*    (2006.01)
*B29C 65/00*    (2006.01)
*B32B 37/10*    (2006.01)
*B30B 7/02*     (2006.01)
*B30B 15/02*    (2006.01)
*B30B 15/06*    (2006.01)

(52) U.S. Cl. .................. 156/580; 156/581; 100/195; 100/225; 100/269.1; 100/295

(58) Field of Classification Search ............... 156/228, 156/383, 510, 516, 580, 581; 100/195, 225, 100/269.1, 295
See application file for complete search history.

(56) References Cited

U.S. PATENT DOCUMENTS

| | | | | | |
|---|---|---|---|---|---|
| 1,206,656 | A | * | 11/1916 | Benedictus | ................ 269/274 |
| 1,875,055 | A | * | 8/1932 | Loetscher | .................... 156/278 |
| 1,993,942 | A | * | 3/1935 | Novotny | .................. 264/328.5 |
| 2,422,979 | A | * | 6/1947 | Pecker | ......................... 493/379 |
| 2,646,105 | A | * | 7/1953 | Langer | ........................ 100/326 |
| 2,907,218 | A | * | 10/1959 | Chabannes | ..................... 74/49 |
| 3,193,881 | A | * | 7/1965 | Kostur | ........................ 425/292 |
| 3,808,968 | A | * | 5/1974 | Notin | .......................... 100/264 |
| 3,946,537 | A | * | 3/1976 | Hair et al. | ..................... 53/559 |
| 4,167,092 | A | | 9/1979 | Medwed | |
| 4,612,081 | A | * | 9/1986 | Kasper et al. | ............ 156/583.1 |

FOREIGN PATENT DOCUMENTS

| | | |
|---|---|---|
| DE | 4022793 | 2/1992 |
| DE | 20100627 | 6/2001 |
| EP | 0039056 | 11/1981 |

* cited by examiner

*Primary Examiner*—Philip C Tucker
*Assistant Examiner*—Sing P Chan
(74) *Attorney, Agent, or Firm*—Andrew Wilford

(57) ABSTRACT

A sealer for bonding a cover foil to a support foil has upper and lower tools having confronting faces between which the foils move in a transport direction, a drive for pressing one of the tools vertically toward the other tool and thereby compressing the foils together between the faces, an intermediate plate between the drive means and the one tool formed with an array of pressurizable chambers. These chambers can be selectively pressurized.

19 Claims, 2 Drawing Sheets

APPARATUS FOR SEALING FOILS TO EACH OTHER

FIELD OF THE INVENTION

The present invention relates to an apparatus for sealing a cover foil to a base foil. More particularly this invention concerns such an apparatus used with a base foil having upwardly open product-filled pockets that are closed by the cover foil.

BACKGROUND OF THE INVENTION

A standard blister package is comprised of a base foil having one or more upwardly open pockets each holding one or more items, e.g. pills, and a cover foil sealed atop the cover foil all around each of the pockets. Such packages are produced in high volume and at high speed in a continuous process where, in spite of the high production rate, it is essential that the cover foil be hermetically sealed completely around each pocket.

Such a production line has supply rolls that feed the cover foil and the support foil through several upstream treatment stations, namely a heater and a shaper for forming blisters or pockets in the support foil and a filler for putting the product into the pockets. A downstream sealer as for example described in U.S. Pat. No. 4,167,092 bonds the cover foil atop the base foil so that in a downstream stamper the bonded together cover foil and support foils can be subdivided into individual packages. According to actual application the format with respect to length and width dimension of the foil in the sealer varies, with an irregular sealing pattern with large sizes that not only is difficult to see, but that also makes it hard to seal uniformly with the considerable disadvantage that pharmaceutical products are not packed accurately.

OBJECTS OF THE INVENTION

It is therefore an object of the present invention to provide an improved apparatus for sealing foils to each other.

Another object is the provision of such an improved apparatus for sealing foils to each other that overcomes the above-given disadvantages, in particular that functions at high speed while still ensuring a full annular seal around each pocket of the support foil.

SUMMARY OF THE INVENTION

A sealer according to the invention for bonding a cover foil to a support foil has upper and lower tools having confronting faces between which the foils move in a transport direction, a drive for pressing one of the tools vertically toward the other tool and thereby compressing the foils together between the faces, an intermediate plate between the drive means and the one tool formed with an array of pressurizable chambers. These chambers can be selectively pressurized.

This sealer has the advantage that in a simple manner it is possible to vary the surface area over which the pressure from the drive is transmitted to the respective tool, so that the two tools push flatly together. It is particularly preferred when there are two intermediate plates with both the upper tool and the lower tool bearing on a respective intermediate plate so that it is possible, depending on the size of the foil sections to be sealed together, to pressurize in the two intermediate plates chambers of the exact same size in the same regions of the tools. In this case the intermediate plates have substantially identical such arrays of chambers and connector lines extend between each of the chambers of the one intermediate plate and the respective identical chamber of the other intermediate plate so that pressure is equalized between each chamber of the one plate and the respective chamber of the other plate.

The chambers according to the invention include a single central chamber of a size corresponding to a minimum seal size. A pair of second chambers spaced apart in the direction directly flank the central chamber. Each of the second chambers has a width measured crosswise of the direction at least equal to a width of the central chamber measured crosswise of the direction. Furthermore according to the invention a pair of third chambers spaced apart transverse to the direction directly flank the central chamber. Each of the third chambers has a length measured in the direction at least equal to a length of the central chamber measured in the direction. In accordance with a particular feature of the invention the second and third chambers are shaped as isosceles trapezoids and have interfitting end edges, thus when the first, second, and third chambers are pressurized, a square or rectangular zone of the one plate at least is raised.

The chambers according to the invention can further include a pair of fourth chambers spaced apart in the direction and directly flanking the second chambers, these fourth chambers being rectangular. Furthermore a pair of fifth chambers spaced apart transverse to the direction can directly flanking the third chambers, these fifth chambers also being rectangular.

The means for pressurizing according to the invention includes fluid-pressure lines connected to the chambers. These lines can be provided with respective shutoff valves and/or pressure limiters. The provision of pressure reducers in the pressure lines allows the pressure in the chambers to be controlled and the specific sealing pressure to be set in the chambers independently of the format size.

The drive includes an eccentric and a crank connected via the respective intermediate plate to one of the tools while the other tool is braced by the respective intermediate plate on a stationary frame. Thus only the one tool is moved while the other tool is stationary in the sealer. It is also of course possible to operate the upper intermediate plate with the drive or to operate the two tools independently of each other with respective drives, in particular to free the foil in the sealer. In addition the one intermediate plate is formed centrally in one of the chambers with a force-transmitting block so that the pressure from the rigid pusher block is ideally distributed according to the pressure in the chambers.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
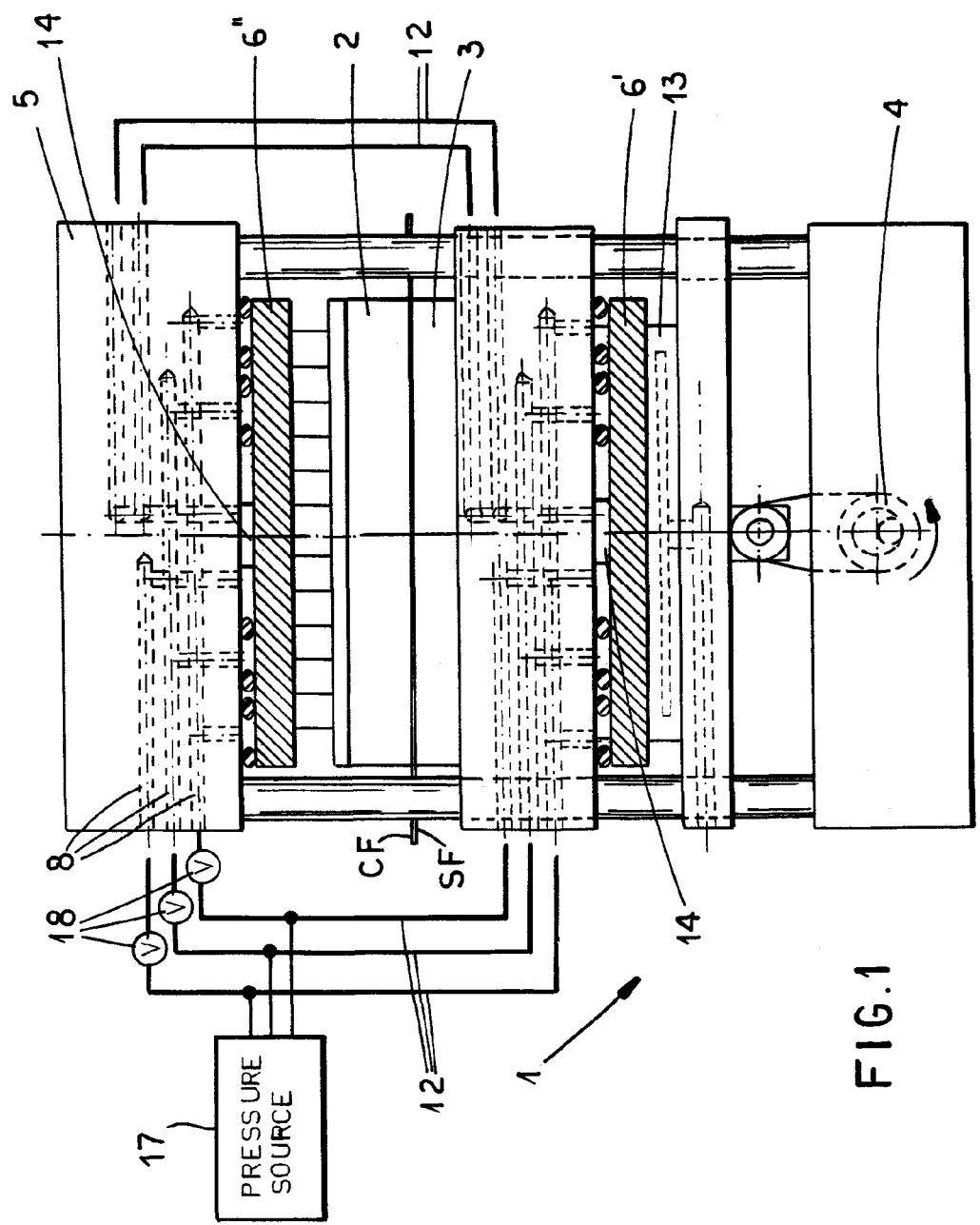
FIGS. 1 and 2 are axial end views partly in section through sealers according to the invention.

As seen in FIG. 1 a sealer 1 of the type typically used in a thermoshaping machine serves for bonding together a cover foil CF and a support foil SF, the cover foil CF and support foil SF being guided between a steel upper tool 2 and a steel lower tool 3. Normally the support foil SF is formed with a row of upwardly open pockets that are filled upstream of the sealer 1 with a product to be packaged.

A drive 4 can move the upper and lower tools 2 and 3 relative to each other, in the drawing the drive 4 being an eccentric crank-type drive bearing on the lower tool 3 while the upper tool 2 is fixedly mounted in an upper frame 5. There is an lower intermediate plate 6' between the drive 4 and the lower tool 3 and an upper intermediate plate 6" between the upper frame 5 and the upper tool 2. Each intermediate plate 6' and 6" is formed of aluminum with a plurality of pressurizable chambers 7, 9, 10, 11, and 15 that can be connected via lines 8 with a pressure source 17 delivering oil-free compressed air. The chambers 7, 9, 10, 11, and 15 are identical in both plates 6' and 6".

Figure 3:
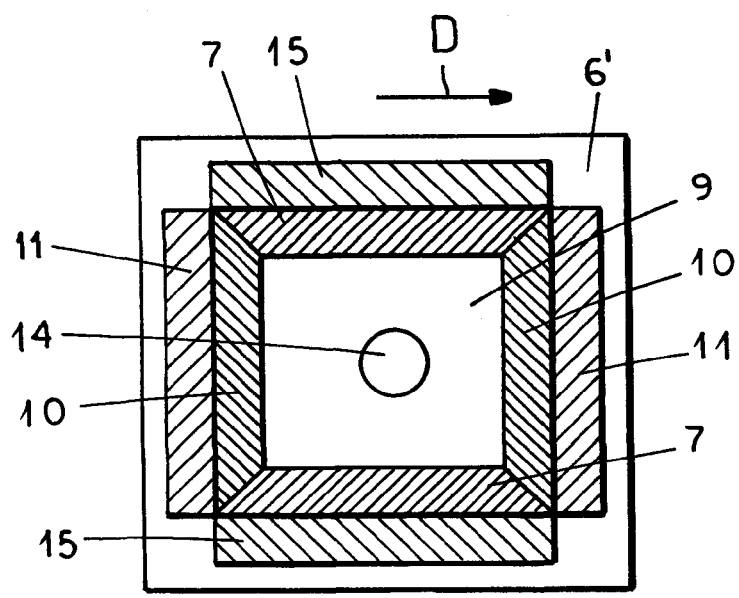
FIG. 3 is a schematic top view of an intermediate plate according to the invention.

As in particular visible in FIG. 3, the first chamber 9 is square and in the center of the respective plate 6' and 6" and has an area equal to the minimum seal area. The second chambers 10 are isosceles trapezoids and flank the first chamber 9 in the travel direction D of the cover and support foils CF and SF, each second chamber 10 having an inner side edge of length measured perpendicular to the direction D equal to the width of the center chamber 9 and a longer outer side edge. Third chambers 7 of the same shape as the second chambers 10 extend in the direction D and flank the center chamber 9 perpendicular to the direction D and fit at their ends with the 45° end edges of the second chambers 10 so that the total area of the first chamber 9, second chambers 10, and third chambers 7 is a square.

Fourth chambers 11 of rectangular shape and having long edges equal in length to and abutting the long side edges of the second chambers 10 flank the second chambers 10 in the direction D, and fifth chambers 15 of rectangular shape and having long edges equal in length to and abutting the long side edges of the third chambers 7 extend in the direction D and flank the third chambers 7 perpendicular to the direction D.

The chambers 7, 9, 10, 11, and 15 in the intermediate plates 6' and 6" make it possible to vary the length and the width of the regions of the tools 2 and 3 that are pushed out somewhat to engage the foils SF and CF and ensure excellent bonding around the pockets formed therein.

In order to be able to vary as much as possible the pressures in the chambers 7, 9, 10, 11, and 15 the lines. 8 are provided with valves 18 that can serve as pressure limiters or simple shutoff valves. It is further notable that the chambers 7, 9, 10, 11 and 15 in the upper intermediate plate 6' and 6" and the lower intermediate plate 6' and 6" are of the same size and are interconnected by lines 12 so that it is easy to ensure that the same pressure is present in the pairs of chambers 7, 9, 10, 11, and 15.

Figure 2:
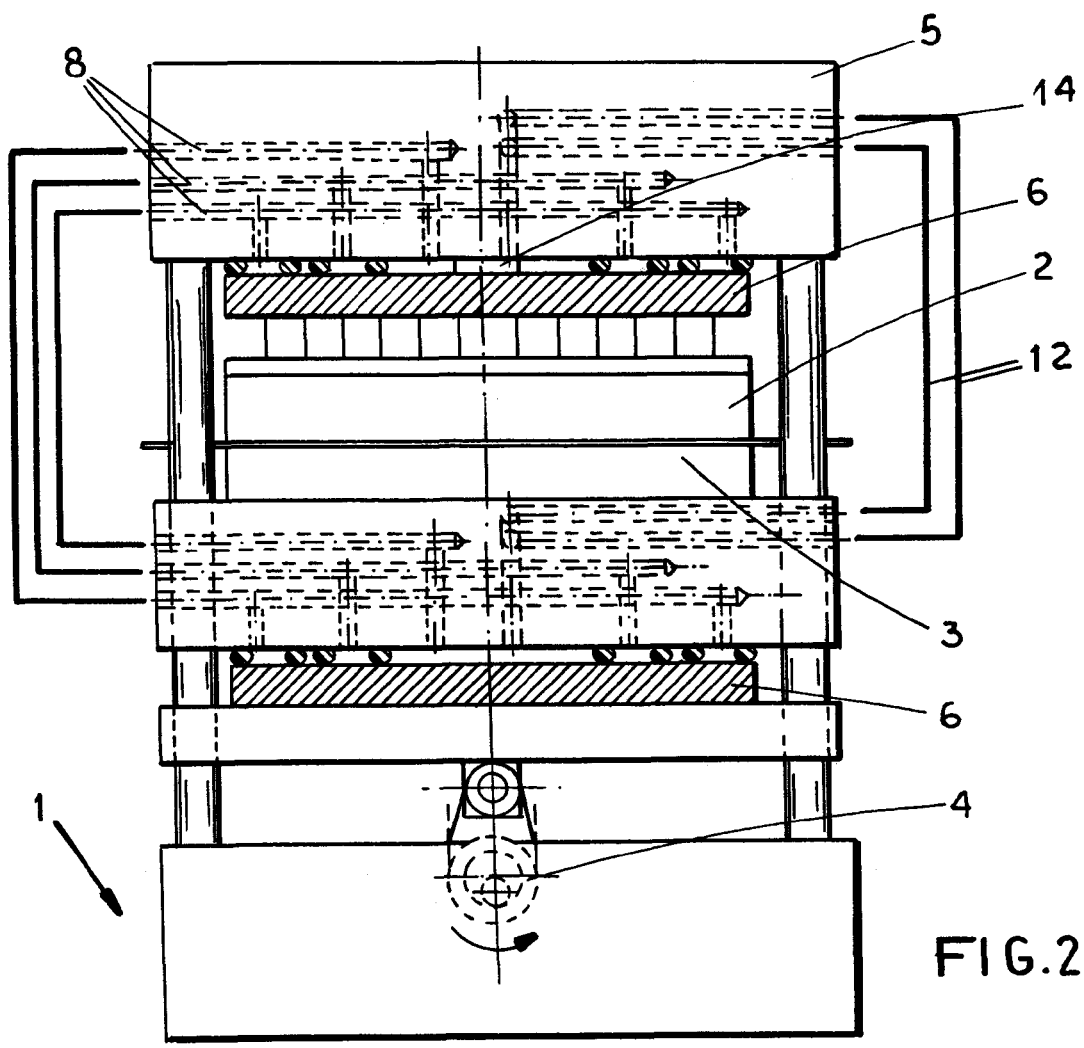

FIG. 1 shows an embodiment that is particularly suited for operation with the pressure in the chambers 7, 9, 10, 11, and 15 always constant, while in the FIG. 2 embodiment the chambers 7, 9, 10, 11, and 15 are only pressurized with air when the tools 2 and 3 are pressed against the cover foil CF and support foil SF. Here the eccentric drive 4 can remain in the upper dead point while with the FIG. 1 embodiment the eccentric drive continues to rotate since the air cushion 13 provided here has the function of a pressure reservoir so as to make the stroke uniform.

FIG. 3 shows that the plate 6', which is generally identical to the plate 6", is provided with a central circular force-transmission block 14 that extends vertically across the central first chamber 9 and ensures force transmission across the plate 6'

I claim:

1. A sealer for bonding a cover foil to a support foil, the sealer comprising:
    upper and lower tools having confronting faces between which the foils move in a transport direction;
    drive means for pressing one of the tools vertically toward the other tool and thereby compressing the foils together between the faces;
    an intermediate plate between the drive means and the one tool formed with an array of pressurizable chambers; and
    means for selectively pressurizing the chambers.

2. The sealer defined in claim 1, further comprising
    a press frame; and
    another such intermediate plate between the frame and the other tool and connected to the pressurizing means.

3. The sealer defined in claim 2 wherein the intermediate plates have substantially identical such arrays of chambers.

4. The sealer defined in claim 3, further comprising
    connector lines extending between each of the chambers of the one intermediate plate and the respective identical chamber of the other intermediate plate, whereby pressure is equalized between each chamber of the one plate and the respective chamber of the other plate.

5. The sealer defined in claim 1 wherein the chambers include a single central chamber of a size corresponding to a minimum seal size.

6. The sealer defined in claim 5 wherein the chambers include
    a pair of second chambers spaced apart in the direction and directly flanking the central chamber.

7. The sealer defined in claim 6 wherein each of the second chambers has a width measured crosswise of the direction at least equal to a width of the central chamber measured crosswise of the direction.

8. The sealer defined in claim 7 wherein the chambers include
    a pair of third chambers spaced apart transverse to the direction and directly flanking the central chamber.

9. The sealer defined in claim 8 wherein each of the third chambers has a length measured in the direction at least equal to a length of the central chamber measured in the direction.

10. The sealer defined in claim 9 wherein the second and third chambers are shaped as isosceles trapezoids and have interfitting end edges.

11. The sealer defined in claim 10, wherein the chambers include
    a pair of fourth chambers spaced apart in the direction and directly flanking the second chambers.

12. The sealer defined in claim 11 wherein the fourth chambers are rectangular.

13. The sealer defined in claim 10 wherein the chambers include
    a pair of fifth chambers spaced apart transverse to the direction and directly flanking the third chambers.

14. The sealer defined in claim 13 wherein the fifth chambers are rectangular.

15. The sealer defined in claim 1 wherein the means for pressurizing includes fluid-pressure lines connected to the chambers.

16. The sealer defined in claim 15 wherein each of the lines is provided with a shutoff valve.

17. The sealer defined in claim 15 wherein each of the lines is provided with a pressure limiter.

18. The sealer defined in claim 1 wherein the drive means includes an eccentric and a crank.

19. The sealer defined in claim 1 wherein the one intermediate plate is formed centrally in one of the chambers with a force-transmitting block.

* * * * *